United States Patent [19]

Crump et al.

[11] 3,996,163

[45] Dec. 7, 1976

[54] POLYMERIZATION CATALYST

[75] Inventors: Ronald Alfred Crump, Horsham; Brian Peter Forsyth Goldie, Cheam; Prem Sagar Thukral, Kenley, all of England

[73] Assignee: The British Petroleum Company Limited, London, England

[22] Filed: Mar. 13, 1975

[21] Appl. No.: 558,009

[30] Foreign Application Priority Data

Mar. 22, 1974 United Kingdom ............ 12793/74

[52] U.S. Cl. .............................. 252/430; 252/428; 252/429 C; 252/431 R; 252/431 N
[51] Int. Cl.² ...................................... B01J 31/02
[58] Field of Search ....... 252/429 C, 431 R, 431 N, 252/430, 428

[56] References Cited

UNITED STATES PATENTS

| | | | |
|---|---|---|---|
| 3,816,340 | 6/1974 | Morris et al. ...................... | 252/430 |
| 3,817,931 | 6/1974 | Brooks et al. ...................... | 252/430 |
| 3,879,362 | 4/1975 | Chalfont et al. ............... | 252/431 R |

*Primary Examiner*—Patrick P. Garvin
*Assistant Examiner*—John P. Sheehan
*Attorney, Agent, or Firm*—Brooks Haidt Haffner & Delahunty

[57] ABSTRACT

Process for making a catalyst precursor by heating an inorganic oxide support with a titanium compound at a temperature in the range 150° to 1200° C and then retreating with titanium one or more times by alternately adding a hydroxyl compound (e.g. water) and titanium compound and heating at 150° to 1200° C. The precursor can be used to make a useful ethylene polymerization catalyst by adding a chromium compound and heat activating at a temperature in the range 100° to 1200° C.

10 Claims, No Drawings

POLYMERIZATION CATALYST

The present invention relates to a process for preparing a titanium modified catalyst precursor and to the use of the precursor in preparing a polymerisation catalyst.

According to the present invention the process for the production of a titanium modified catalyst precursor comprises (1) adding a first titanium compound to a catalyst support material comprising a difficultly reducible inorganic oxide having chemisorbed surface hydroxyl groups and heating to a temperature in the range 150° to 1200° C and (2) retreating with titanium by carrying out the following steps (a) and (b) one or more times; (a) reforming some hydroxyl groups on the surface of the titanium-treated support material by reaction with a hydroxyl-containing compound and (b) adding a second titanium compound to the support material and heating at a temperature in the range 150° to 1200° C.

The first and second titanium compound can be the same or different and are suitably selected from compounds represented by the formulae (I) $(R')_n$ Ti $(OR')_m$ (II) $(RO)_m$ Ti $(OR')_n$; where $m$ is 1, 2, 3 or 4; $n$ is 0, 1, 2 or 3; $m + n = 4$; and (III) Ti $X_4$; (IV) titanium acetylacetonate compounds and (V) alkanolamine titanates where R is alkyl, aryl or cycloalkyl radical or a combination of two or more thereof such as aralkyl or alkaryl, each radical having 1 to 12 carbon atoms, inclusive; R' is a radical as defined for R or a cyclopentadienyl or $C_2 - C_{12}$ alkenyl radical, e.g. ethenyl, propenyl, isopropenyl or butenyl; and X is halogen, e.g. chlorine. Titanium compounds represented by the formula $(RO)_4$ Ti are preferred, particularly the alkyl compounds having 1 to 6 carbon atoms in each alkyl group, for example tetra-ethyl titanate and tetraisopropyl titanate. Titanium acetylacetonate compounds can be, for example, titanium diacetylacetonate diisopropylate, titanium dichlorodiacetylacetonate or the so-called "titanium acetylacetonate" or "titanyl acetyl acetonate". The alkanolamine titanate can be, for example, triethanolamine titanate. When it is desired to carry out steps (a) and (b) more than once, the second titanium compounds employed can be the same or different.

It is believed that the titanium compounds are chemisorbed by the support material and the titanium-treated support material containing the reformed surface hydroxyl groups respectively. This is supported by the fact that when an excess of a volatile titanium compound (e.g. isopropyl titanate) is refluxed in the presence of the support material (e.g. silica) and then the reflux condenser is removed, a quantity of titanium compound used in stage (I) of the process of the present invention is at least the quantity that can be chemisorbed by the support material and the quantity used in stage (II) is at least the quantity that can be chemisorbed by the titanium-treated support material.

The catalyst support material employed in the process of the present invention comprises a difficulty reducible inorganic oxide having chemisorbed surface hydroxyl groups, examples of such inorganic oxides being silica, alumina, zirconia or thoria. Composites of such oxides, for example, silica-alumina are also suitable. Silica is the preferred inorganic oxide. Particularly preferred are microspheroidal silicas having a surface area (B.E.T.) of 200 to 600 square meters per gramme and a pore volume (as measured by the technique of water porosimetry) of 0.5 to 2.5 milliliters/gramme.

The hydroxyl-containing compound used in the process of the present invention must be capable of reforming surface hydroxyl groups on the inorganic oxide after the latter has been heated during the first step. Examples of such compounds are water and alcohols, e.g. aliphatic alcohols. Water is preferred.

The quantity of hydroxyl-containing compound is suitably sufficient to reform at least some hydroxyl groups on the oxide surface. Preferably a slight excess is used over the quantity required to rehydroxylate the surface but use of an over excessive quantity should be avoided since its presence or subsequent removal could damage the pore structure of the support. When an excess of the hydroxyl-containing compound is employed, the excess must be removed before the addition of the second titanium compound, for example by distillation or by fluidising the support in a stream of hot gas.

The hydroxyl-containing compound can be reacted with the titanium-treated support material at any desired temperature. Preferably the support material is cooled after the first heating stage to a temperature at or near ambient temperature before reacting with the hydroxyl compound. The hydroxyl-containing compound and the support material can be brought together by any desired means, for example by adding the hydroxyl compound and stirring or otherwise agitating the mixture or by passing the vapour of a volatile hydroxyl compound into the support material.

The catalyst support material employed in the process of the present invention should be substantially free from absorbed water prior to the addition of the first titanium compound thereto. Preferably the support material is dried by heating in an oven or a fluidised bed at 50° to 800° C for several hours.

The addition of the first or second titanium compound to the catalyst support material is preferably carried out so that the titanium compound is distributed substantially uniformly on the surface of the silica during the heating steps. This can be accomplished, for example, by dissolving the titanium compound in a suitable solvent and mixing the solution with the support material; by shaking together the support material and the titanium compound in powdered form (where it is a solid); by absorbing a naturally liquid titanium compound or a molten solid titanium compound into the agitated or fluidised support material or by passing the vapour of a titanium compound into a fluidised bed of the support material.

The heating in stage (I) of the process of the present invention is preferably carried out at a temperature in the range 500 to 1,000° C and the heating in stage (II) at a temperature in the range 500° to 1,000° C.

A further aspect of the present invention provides a process for preparing a polymerisation catalyst suitable for polymerising 1-olefins comprising incorporating in the catalyst precursor of the present invention under substantially anhydrous conditions a chromium compound and heating at a temperature in the range 100° to 1,200° C to produce an active polymerisation catalyst.

The chromium compound can be any substantially anhydrous chromium compound capable of forming in conjunction with the catalyst precursor an active catalyst for 1-olefin polymerisation. Examples of such chromium compounds are chromium salts such as chromic sulphate and chromic nitrate; chromium oxides and oxy-compounds such as ammonium chromate and tertiary butyl chromates (e.g. ditertiary butyl chromate); and organic chromium compounds such as chromium acetyl acetonate and bis(cyclopentadienyl) chromium. The compound ditertiarybutyl chromate is preferred.

The total chromium content of the polymerisation catalyst formed by the process of the present invention is suitably in the range 0.02 to 30 weight % and preferably 0.1 to 5.0 weight % based on the total weight of catalyst.

The chromium compound can be incorporated in the catalyst precursor by any suitable technique, for example dry mixing, dissolution of the chromium compound in a suitable inert non-aqueous solvent, ball milling or in the case where a volatile chromium compound is used (e.g. $CrO_2Cl_2$) the compound may if desired be vapourised and passed into the catalyst precursor or carried therein in a stream of dry gas (e.g. air, nitrogen or oxygen).

The catalyst activation procedure comprises heating the catalyst at a temperature in the range 100°–1,200° C, preferably in the range 200° to 900° C most preferably in the range 200° to 700° C so that an active polymerisation catalyst is produced. It will be appreciated that if the sintering temperature of the support is below 1,200° C it will be necessary to keep the activation temperature below the sintering temperature in order to produce an active polymerisation catalyst. It is ordinarily preferred that the heating be conducted in a stream of dry gas, e.g. air. The duration of the heating is suitably a few minutes to several hours for example ½ to 12 hours. In general, lower activation temperatures e.g. 200°–400° C tend to produce catalysts capable of polymerising 1-olefins to polyolefins (e.g. ethylene to polyethylenes) having very high melt indices.

In accordance with a further aspect of the present invention a process for polymerising 1-olefins comprises contacting the monomeric material under polymerisation conditions with the polymerisation catalyst of the present invention.

The monomeric material may consist of any suitable 1-olefin or mixtures of 1-olefins. Preferably the monomeric material consists of ethylene as sole monomer or mixtures of ethylene with other 1-olefins, for example propylene, 1-butene, 1-pentene, 1-hexene, 4-methyl-1-pentene, 1,3-butadiene or isoprene when it is desired to make copolymers. Preferably not more than about 25 weight % (based on the total monomeric material) of these comonomers are added to the ethylene.

The polymerisation conditions i.e. reaction conditions, and the recovery techniques, apparatus etc. employed in the polymerisation process of the present invention can be, for example, in accordance with the techniques employed in the well-known Phillips processes. Phillips polymerisation processes are described for example in British patent specifications Nos. 790,195; 804,641; 853,414; 886,784 and 899,156. The polymerisation reaction can be carried out, for example, under reaction conditions such that the polymer is formed in solution in a suitable solvent (the so-called Phillips 'solution form' process) or so that the polymer is formed as solid particles suspended or fluidised in a diluent which can be liquid or gaseous (so-called 'particle form' processes). In the gas-phase polymerisation the diluent can be the gaseous monomer. Normally, the gaseous diluent is recycled and cooled to control the temperature of the polymerisation reaction.

It is preferred to carry out the polymerisation or copolymerisation reaction under particle form process conditions and under these conditions the diluent is preferably a liquid diluent (see for example British patent specifications Nos. 853,414; 886,784 and 899,156).

Where a liquid diluent is employed in the polymerisation or copolymerisation reaction, it can be any hydrocarbon which is chemically inert and non-deleterious to the catalyst under the reaction conditions. Generally the diluent is selected from the groups consisting of paraffins and cycloparaffins having from 3–30 carbon atoms per molecule. Suitable diluents include for example isopentane and isobutane. When the polymerisation process of the present invention is operated under particle form process conditions in a liquid diluent, the preferred liquid diluent isobutane. Liquid diluents, when used, are generally present in sufficient amounts so that the concentration of monomeric material in the total hydrocarbon feed is of the order of 2–10 wt % although concentrations outside this range can be employed if desired.

For further details of particle form process conditions and other process conditions which can be employed in the polymerisation process of the present invention reference may be made to the aforementioned British Patent Specifications.

The polymerisation pressure is preferably high enough to maintain the diluent, when a liquid diluent is used, in the liquid phase and to ensure that the monomeric material if not liquefied under the conditions used, is dissolved in the liquid phase in sufficient amount. Pressures of the order of 50 to 700 pounds per square inch (psi) are generally adequate for this purpose. In general the reaction pressure can vary from approximately atmospheric to as high as several thousand psi. The residence or reaction time can vary from a few minutes to several hours and is generally in the range 15 minutes to 3 hours.

The polymerisation reaction can be conducted for example by contacting the monomeric material or the monomer-containing hydrocarbon feed with a fixed bed of the catalyst, with a gravitating bed of the catalyst, with the catalyst suspended in finely divided particulate form in a diluent and being maintained in suspension by agitation; or by use of a fluidised bed technique.

If desired, the polymerisation can be conducted in the presence of hydrogen gas to increase the melt index of the produced polymer. In general, the higher the partial pressure of hydrogen in the reaction zone the lower becomes the molecular weight of the produced polymer.

Methods of recovering the product polyolefin are well-known in the art and for further description of recovery techniques references may be made to the aforementioned British Patent Specifications.

The process of the present invention can be used to make polyethylene and copolymers thereof having a wide range of melt indices. It is particularly useful for the production of high melt index polyethylene.

The invention is illustrated by the following Examples wherein Example 1 is according to the invention and Example 2 is by way of comparison.

In the Examples the melt index (MI) and high load melt index (HLMI) were determined according to ASTM method 1238 using 2.16 Kg and 21.6 Kg loads respectively. The units are grammes per 10 minutes. The melt index ratio is HLMI/MI.

EXAMPLE 1

A silica support, commecially available from W. R. Grace & Co., and known as 952 silica was impregnated with a petroleum ether solution of Ti(OPr$^i$)$_4$ containing approximately 5% by weight of Ti based on the weight of the silica. The 952 silica had previously been dried at 150° C. After removal of the solvent the product was heated at 800° C for 3 hours by fluidising in a stream of dry air.

The titanium-treated silica was cooled and covered with distilled water and the resultant slurry shaken mechanically for 15 minutes. The water was distilled off and and the product dried at 150° C. A second treatment of the product with a petroleum ether solution of Ti(OPr$^i$)$_4$ containing approximately 5% by weight of Ti based on the weight of the silica was carried out. The petroleum ether (solvent) was decanted and the titanium-treated silica washed and decanted three times with fresh petroleum ether (to remove unreacted titanium) and the final traces of solvent distilled off. The titanium-treated silica was heated for 4 hours at 800° C by fluidising in a stream of dry air.

A petroleum ether solution of the reaction product of 0.3g CrO$_3$ and 1.5ml tertiary butyl alcohol (i.e. ditertiary butyl chromate) was added to a petroleum ether slurry of 15g of the above titanium-treated silica. The solvent was removed by distillation.

The catalyst was activated at 450° C for approximately 5 hours by fluidising in a stream of dry air. The titanium and chromium contents of the catalyst were 8.75 and 0.84 w/w% respectively.

The catalyst (0.109g) was then charged to a nitrogen purged ½ gallon autoclave. Isobutane (1,000ml) was then charged to the autoclave and ethylene admitted to raise and maintain a pressure of 600 psi. The reaction temperature was controlled at 101° C for 37 minutes. The yield of polyethylene was 515g and the productivity was 7660g polymer/g catalyst/hour.

The melt index properties of the polymer were measured after treatment with antioxidant and homogenisation on a roll mill at 150° C. The MI and MIR of the polymer were 9.5 and 98 respectively.

EXAMPLE 2 (Comparison)

A silica support, commercially available from W. R. Grace & Co., and known as 952 silica was impregnated with a petroleum ether solution of Ti(OPr$^i$)$_4$. The 952 silica had previously been dried at 150° C. After removal of the solvent, the titanium modified silica was heated at 800° C for 4 hours by fluidising in a stream of dry air.

A petroleum ether solution of the reaction product of 1.2g CrO$_2$ and 6.0ml t-butyl alcohol was added to a petroleum ether slurry of 60g of the above titanium modified silica. The solvent was removed by distillation.

The catalyst was heated at 450° C for approximately 5 hours by fluidising in a stream of dry air. The titanium and chromium contents of the catalyst were 5.0 and 0.94 w/w% respectively.

The catalyst (0.085g) was then charged to a nitrogen purged 1 liter autoclave. Isobutane (550ml) was then charged to the autoclave and ethylene admitted to raise and maintain a pressure of 600 psi. The reaction temperature was controlled at 101° C for 50 minutes. The yield of polyethylene was 240g and the productivity was 3390g polymer/g catalyst/hour.

The melt index properties of the polymer were measured after treatment with antioxidant and homogenisation on a roll mill at 150° C. The MI and MIR of the polymer were 3.0 and 91 respectively.

EXAMPLE 3 (Invention)

a. A silica support, commercially available from W. R. Grace & Co., and known as 952 silica was impregnated with a petroleum ether solution of Ti(OPr$^i$)$_4$ containing approximately 5% by weight of Ti based on the weight of the silica. The 952 silica had previously been dried at 150° C. After removal of the solvent, the product was heated at 800° C for 4 hours by fluidising in a stream of dry air.

b. The titanium-treated silica was cooled and covered with distilled water and the resultant slurry shaken mechanically for 15 minutes. The water was distilled off and the product dried at 150° C. A second treatment of the product with a petroleum ether solution of Ti(OPr$^i$)$_4$ containing ~5% by weight of Ti based on the weight of the silica, was carried out. The petroleum ether (solvent) was decanted and the titanium-treated silica washed and decanted three times with fresh petroleum ether (to remove unreacted titanium) and the final traces of solvent distilled off. The product was heated for 4 hours at 800° C by fluidising in a stream of dry air. (c) Step (b) was repeated to give a product which had been treated with titanium three times.

A petroleum ether solution of the reaction product of 0.4g CrO$_3$ and 2.0 ml tertiary butyl alcohol (i.e. ditertiary butyl chromate) was added to a petroleum ether slurry of 20g of the above titanium-treated silica. The solvent was removed by distillation.

The catalyst was activated at 450° C for approximately 3½ hours by fluidising in a stream of dry air. The titanium and chromium contents of the catalyst were 12.3 and 1.06 w/w% respectively.

The catalyst (0.119g) was then charged to a nitrogen purged ½ gallon autoclave. Isobutane (1,000 ml) was then charged to the autoclave and ethylene admitted to raise and maintain a pressure of 600 psig. The reaction temperature was controlled at 98° C for 70 minutes. The yield of polyethylene was 450g and the productivity 3240g polymer/g catalyst/hour.

The melt index properties of the polymer were measured after treatment with antioxidant and homogenisation on a roll mill at 150° C. The MI and MIR of the polymer were 12.8 and 83 respectively.

EXAMPLE 4 (Invention)

A silica support, commercially available from W. R. Grace & Co., and known as 952 silica was impregnated with petroleum ether solution of Ti(OPr$^i$)$_4$ containing ~5% by weight of Ti based on the weight of the silica. The 952 silica had previously been dried at 150° C. After removal of the solvent the product was heated at 800° C for 4 hours by fluidising in a stream of dry air.

The titanium-treated silica was cooled, 3 ml absolute alcohol (ethanol) added and the product was mixed by rolling in a bottle on a roll mill for 30 minutes.

A second treatment of the dried product with a petroleum ether solution of Ti(OPr$^i$)$_4$ containing ~5% by weight of Ti (based on the weight of silica) was carried out. The petroleum ether (solvent) was decanted and the titanium-treated silica washed and decanted three times with fresh petroleum ether (to remove unreacted titanium) and the final traces of solvent distilled off. The titanium-treated silica was heated at 800° C for 4 hours by fluidising in a stream of dry air.

A petroleum ether solution of the reaction product of 0.4g $CrO_3$ and 2.0 ml tertiary butyl alcohol (i.e. ditertiary butyl chromate) was added to a petroleum ether slurry of 20g of the above titanium-treated silica. The solvent was removed by distillation.

The catalyst was activated at 450° C for approximately 4 hours by fluidising in a stream of dry air. The titanium and chromium contents of the catalyst were 6.95 and 0.98 w/w% respectively.

The catalyst (0.100g) was then charged to a nitrogen purged ½ gallon autoclave. Isobutane (1,000 ml) was then charged to the autoclave and ethylene admitted to raise and maintain a pressure of 600 psig. The reaction temperature was controlled at 100° C for 60 minutes. The yield of polyethylene was 523g and the productivity was 5230g polymer/g catalyst/hour.

The melt index properties of the polymer were measured after treatment with antioxidant and homogenisation on a roll mill at 150° C. The MI and MIR of the polymer were 4.4 and 104 respectively.

We claim:

1. In a process for preparing a polymerization catalyst containing titanium and chromium on a difficulty reducible organic solid said catalyst being suitable for polymerising 1-olefins the improvement which comprises (1) adding a first titanium compound to a catalyst support material comprising a difficulty reducible inorganic oxide having chemisorbed surface hydroxyl groups and heating to a temperature in the range 150° to 1,200° C, (2) retreating with titanium by carrying out the following steps (a) and (b) one or more times: (a) reforming some hydroxyl groups on the surface of the titanium-treated support material and (b) adding a second titanium compound to the support material and heating at a temperature in the range 150° to 1,200° C to form a catalyst precursor, (3) incorporating in the catalyst precursor under substantially anhydrous conditions a chromium compound and heating at a temperature in the range 100°–1200° C to produce an active polymerization catalyst.

2. A process as claimed in claim 1 wherein the first and second titanium compounds are selected from compounds represented by the formulae (I) $(R')_n$ Ti $(OR')_m$, (II) $(RO)_m$ Ti $(OR')_n$, (III) Ti $X_4$, (IV) titanium acetyl acetonate compounds and (V) alkanolamine titanates wherein R is alkyl, aryl or cycloalkyl radical, each radical having 1 to 12 carbon atoms; R' is a radical as defined for R or a cyclopentadienyl or $C_2$–$C_{12}$ alkenyl radical; and X is halogen.

3. A process as claimed in claim 2 wherein the titanium compound is tetraisopropyl titanate.

4. A process as claimed in claim 1 wherein the quantity of titanium compound used in stage (1) is at least the quantity that can be chemisorbed by the support material and wherein the quantity of titanium compound used in stage (2) is at least the quantity that can be chemisorbed by the titanium-treated support material.

5. A process as claimed in claim 1 wherein the difficulty reducible inorganic oxide is selected from silica, alumina, zirconia and thoria.

6. A process as claimed in claim 1 wherein the hydroxyl groups are reformed on the surface of the titanium treated support material by treating the said support material with water.

7. A process as claimed in claim 1 wherein the chromium compound is ditertiary butyl chromate.

8. A process as claimed in claim 1 wherein the heating of the catalyst precursor and the chromium compound in stage (3) is carried out at a temperature in the range 200° to 700° C.

9. A process as claimed in claim 8 wherein the heating in stage (3) is carried out at a temperature in the range 200° to 400° C.

10. A process as claimed in claim 1 wherein in the preparation of the catalyst precursor the stage (1) heating is carried out at a temperature in the range 500° to 1,000° C, and the stage (2) heating is carried out at a temperature in the range 500° to 1,000° C, and the precursor and the chromium compound are heated together in stage (3) at a temperature in the range 200° to 400°C.

* * * * *

UNITED STATES PATENT AND TRADEMARK OFFICE
CERTIFICATE OF CORRECTION

PATENT NO. : 3,996,163
DATED : December 7, 1976
INVENTOR(S) : RONALD ALFRED CRUMP, BRIAN PETER FORSYTH GOLDIE, and PREM SAGAR THUKRAL It is certified that error appears in the above-identified patent and that said Letters Patent are hereby corrected as shown below:

Col. 1, line 55, after "compound used" and before "in stage (1)" insert the following:
--does not volatilise. Preferably the quantity of titanium compound used--

Col. 3, line 14, after "suitable" and before "technique" insert --anhydrous--.

Signed and Sealed this

Eighth Day of March 1977

[SEAL]

Attest:

RUTH C. MASON
Attesting Officer

C. MARSHALL DANN
Commissioner of Patents and Trademarks